May 3, 1927.
J. A. DIENNER ET AL
1,627,078
CONTROLLER FOR FISH LURES
Filed Sept. 15, 1924    2 Sheets-Sheet 1
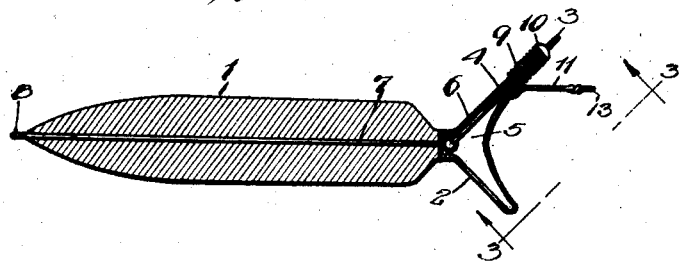
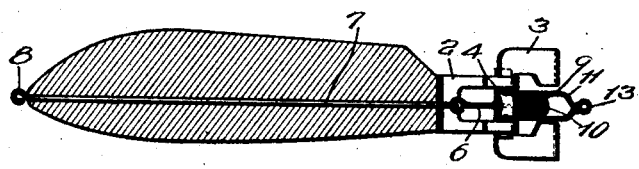
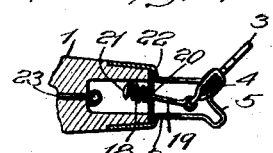
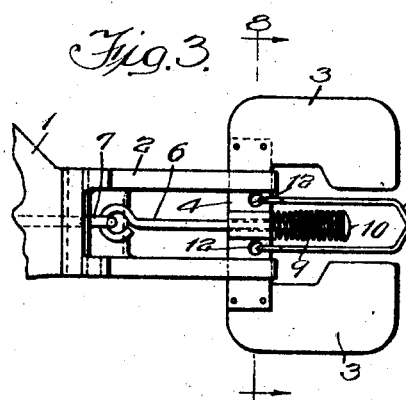
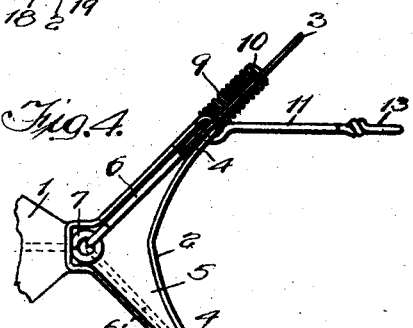
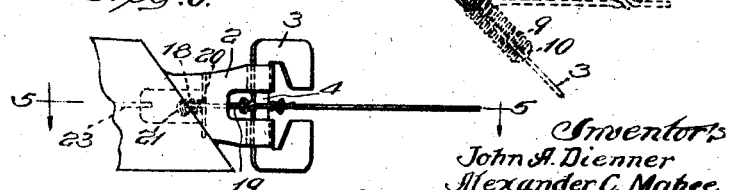
Witnesses:
W. F. Kilroy
Harry R. L. White
Inventors
John A. Dienner
Alexander C. Mabee
By Brown Boettcher Dienner
Att'ys May 3, 1927.

J. A. DIENNER ET AL 1,627,078

CONTROLLER FOR FISH LURES

Filed Sept. 15, 1924    2 Sheets-Sheet 2

Witnesses:
W. P. Kilroy
Harry R. L. White

Inventors
John A. Dienner
Alexander C. Mabee

Brown Boettcher Dienner
By
Attys

Patented May 3, 1927.

1,627,078

UNITED STATES PATENT OFFICE.

JOHN A. DIENNER, OF CHICAGO, AND ALEXANDER C. MABEE, OF VILLA PARK, ILLINOIS.

CONTROLLER FOR FISH LURES.

Application filed September 15, 1924. Serial No. 737,652.

Our invention relates to artificial bait or lures such as are employed in fishing.

The effectiveness of a bait or lure for catching fish is hard to explain, but it seems from our experience as well as the experience of others, that a bait to be effective must simulate or at least suggest some natural or live object which the fish is accustomed or likely to strike.

All artificial baits or lures with which we are familiar have the same mode of advance through the water, namely that they move in the direction in which the attached line is pulled. This results in general, in a substantially straight path of travel. It is often observed that a bass will trail along behind a lure for quite a long way without striking. Apparently, the motion of the lure is not like that of a frog or minnow which would try to dart off sidewise to avoid the pursuer. We have conceived the idea that if the lure could be made to deviate from a straight path, for example, to dart off sidewise, it would be more effective.

According to the preferred embodiment of our invention, we use a buoyant type of lure and cause it to dart laterally under the control of the operator. It is within the scope of the present invention to cause the bait to move up and down or otherwise deviate laterally from the straight line of travel, which has heretofore prevailed.

In carrying out our invention, we have made the lure in two parts; first a controlling vane, and second the main body which simulates a minnow, frog or the like. The controlling vane is adapted to assume one of two positions with respect to the body. In one position the vane lies at an acute angle to the right of the longitudinal line of the body and in the other position the vane lies at substantially the same acute angle to the left of the longitudinal line of the body. Mechanism is provided to cause the vane to assume either one or the other of these positions and no intermediate position.

The controlling and retrieving line is attached to the vane at a point adjacent the pivotal connection of the vane and the body. The result is that the vane and body start off in a path lying at an angle with respect to the line. Since the point of attachment of the line is between the point of connection of the vane and body and the outer end of the vane, the inclination of the vane controls the direction of movement to a very pronounced degree and throws the lure or bait off laterally.

According to the preferred form of our invention means under the control of the operator through the pull upon the line makes shifting of the vane from one position to the other possible and the bait can then be made to dart off in another direction.

Now it is not necessary that these positions which we have indicated, lie upon opposite sides of the longitudinal line of the body, one of the positions may in fact be directly in line with the body, but they must be angularly disposed with respect to each other in order to secure the desired effect.

The means which we employ to secure change of direction is a Y or V shaped guide for the vane, so arranged, that when pull upon the line is let up the vane will tend to move back toward the center of the guide. If the line has taken an angular position at one side of the longitudinal line, a pull upon the line immediately after slackening tends to throw the vane over into the other arm of the Y or V shaped guide.

One particular embodiment of our invention is illustrated in the accompanying drawings, forming a part of this application, in which—

Figure 1 is a horizontal sectional view of a bait or lure embodying the invention, with the customary hooks removed therefrom.

Figure 2 is a vertical sectional elevation of the same bait or lure.

Figure 3 is a fragmentary side view taken on the line 3—3 of Figure 1.

Figure 4 is a fragmentary plan view taken from the top showing the operating mechanism in full lines in one position and in dotted lines in another position.

Figure 5 is a fragmentary horizontal sectional view of a smaller and more compact construction, taken on line 5—5 of Fig. 6.

Figure 6 is a side sectional elevation of Figure 5.

Figure 7:
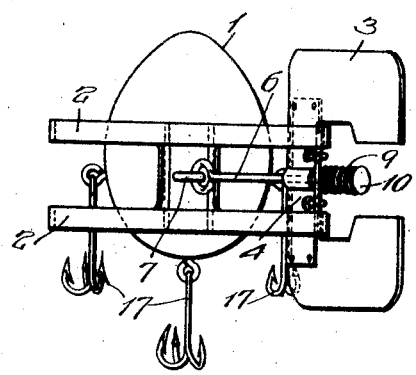
Figure 7 is a front elevation of the embodiment shown in Figures 1 to 4.
Figure 8:
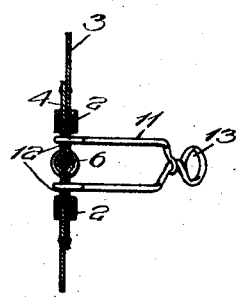
Figure 8 is a fragmentary sectional view on the line 8—8 of Figure 3.

In the drawings, the reference numeral 1 denotes a bait or lure body that may be made of any suitable material, preferably buoyant material such as wood, and may be of any desired shape or finish, preferably such as will most closely imitate a minnow, or small aquatic animal.

Mounted on the front end of the body 1 is a Y or V shaped guide 2 adapted to hold and guide the rudder or vane 3 in the base and legs of the Y or V. The rudder or vane is composed of the blades and of the flat connecting bar portion 4 which connects the blades and rides in the opening 5 in the base and legs of the Y or V shaped guide 2.

In the construction shown in Figures 1, 2, 3, 4, 7 and 8, the flat connecting bar portion 4 of the rudder 3 has an opening in its central portion through which passes the connecting member 6. This connecting member 6 is pivotally connected at one end to the member 7 which passes through the body 1 of the bait or lure and ordinarily has hooks attached to its opposite end at 8. The front end of the connecting member 6 passes through a coil spring 9 and has at its end an enlarged portion or head 10 which engages one end of the spring 9, which is mounted on said stem 6. The other end of the coil spring 9 engages the flat connecting bar portion 4 of the rudder 3.

The U shaped or yoke member 11 is attached to the flat connecting bar portion 4 of the rudder 3 at the points 12, shown clearly in Figure 3, by a flexible connection permitting free lateral movement. The line 14 is attached to the U shaped member 11 at its forward end 13. It will thus be seen that any pull upon the hooks attached to the bait or lure is carried through the indicated parts directly to the line without, of necessity, placing the strain upon the legs of the guiding member 2. This guiding member 2 can easily be made of sufficiently strong construction to carry any ordinary strain but the construction shown gives added strength which is a desirable feature.

The coil spring 9 is of such proportions that, when little or no pull is placed on the line 14, the spring 9 will force the member 4 backward into the base of the guide 2 but when the line 14 is pulled forward, the spring 9 will permit the member 4 to move forward into one or the other of the two legs of the guide 2. When the member 4 moves forward into one leg or the other of the guide member it will place the rudder 3 pointing in the direction of the leg of the guide member into which the member 4 has moved. This direction, in either case, will be at an angle to the longitudinal axis of the bait or lure and at an angle to the general line of pull of the retrieving line. Movement through the water or movement of the water will then cause the bait or lure to move toward the side indicated by the direction of the rudder.

It will be noted that the point of attachment of the line, for all practical purposes is near or adjacent the flexible joint 12 which is to the rear of the front portion of the rudder blades. This method of attachment is very important and is far more effective in giving direction to the bait or lure than is a movable tail even though under the control of the fisherman as is disclosed by the prior art. It also makes a change of direction possible.

It is evident that if the line is pulling upon the front end of a bait or lure the setting of the tail at an angle will have only a slight effect upon the direction taken by the bait or lure, but if the construction herein disclosed is used it will act quickly and positively to change the direction of movement.

It is also evident that if the connecting bar member of the rudder is pulled into operative position into one leg of the guide member 2 and retained there against a continuous pull upon the line, the bait or lure will move to one side until it becomes overbalanced, when it will turn over and start moving in the opposite direction. This turning over process may be relatively slow and in that case, the path taken by the bait or lure will be circular with the plane of the circle at approximately right angles to a line drawn from the center of the plane to the source of the pull. It is not desirable to produce a rotary movement as this will twist the line.

Figure 10:
Figures 10 and 11 are, respectively, top plan and side views of a modified construction.
Figure 11:
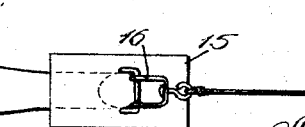

Figures 10 and 11 illustrate a bait or lure which will operate as described in the preceding paragraph. In this construction the flat plate 15 is attached to the body 1 at an angle as shown. The line is attached at the point 16. The hooks are attached at the opposite end at the sides of the bait or lure so that the device is balanced when the plate 15 is pointing laterally in either direction.

It is not necessary that the plate 15 should be flat. It may be convex or any other shape which will secure the desired angular contact with the water. The angle at which the water strikes the plate 15 will determine the kind and degree of movement of the bait or lure obtained.

In all of the other constructions shown it is desirable to have only one position in which the bait or lure is balanced. This is preferably secured by having a buoyant body with a downwardly inclined front face such as is well known in the art. To assist in accomplishing this purpose, it is desirable to have hooks suspended at the bottom of the bait or lure as shown at 17 in Figure 7.

In Figures 1, 2, 3, 4, 7 and 8 the mechanical construction is exaggerated in size as compared to the size of the bait or lure body 1. This is only for the purpose of easy illustration of the principles and the mechanism involved. In actual practice the legs of the Y guide member 2 need be no longer than is necessary to hold the member 4 firmly and thus give direction to the rudder. Such a construction is illustrated in Figures 5 and 6.

Figures 5 and 6 also illustrate a modified construction, which eliminates certain of the possible disadvantages of the bait or lure shown in Figure 1. In Figures 5 and 6 it will be noted that the spring 18 is enclosed within the body 1 back of the edge of the vane, which enables us to attach the line to the member 4 directly, at its middle point where is also attached the connecting member 19. This connecting member 19 passes through the opening 20, then through the coil spring 18 and ends in an enlarged portion 21, which is sufficiently large to bring pressure upon the spring which is compressed against the member 22. The member 22 may be connected by a yoke to the member 23 which passes through the body 1 and thus give added strength to the pull if desired.

Figure 9:
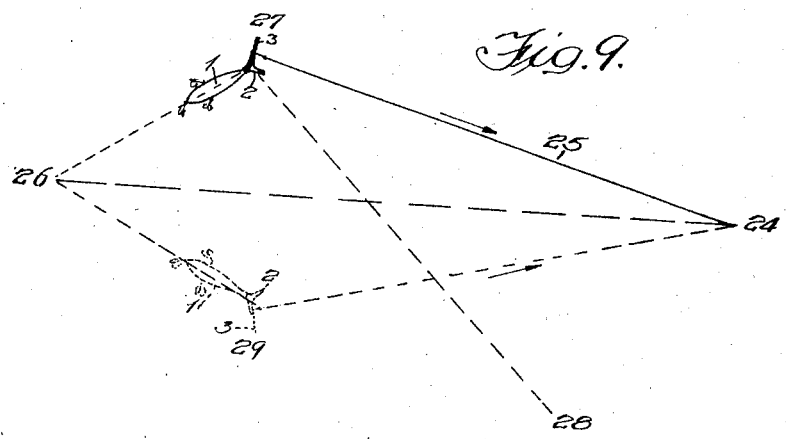
Figure 9 is a diagrammatic plan view showing the action of the bait in use.

Figure 9 illustrates, in a diagrammatic manner, the operation of the device. The point 24 represents the point from which the bait or lure is being operated. The bait or lure has been cast and landed at the point 26. The line 25 was then pulled as in reeling in and the rudder assumed the position shown at 27 which caused the bait or lure to move to the right to the position shown in the heavy lines. The pull on the line is now released and the spring pulls the rudder back so that the member 4 is in the base of the Y member 2. Another pull takes the member 4 into the opposite leg of the Y member and the bait or lure then takes the new direction 28. Had the member 4 been pulled into the opposite leg of the Y member at the first pull, the bait or lure would have moved toward the position 29 as indicated in the dotted lines. It is evident that, after the initial direction has been taken, the direction can be controlled at the will of the operator so long as the bait or lure can retain its balance.

From what has been said above, it is evident that our invention will operate either in still water or in moving water. In still water the operation is accomplished by reeling in or pulling in the line to which the bait or lure is attached. In running water the bait or lure may be operated in the same manner or it may be thrown into the water and permitted to float down stream to the desired distance where the pressure of the water upon the bait or lure will cause the same operation as when reeling or pulling in. When the bait or lure has moved sufficiently far to one side it can be caused to move to the other side by giving slack to the line and letting the movement of the water bring it taut again. We are aware that the preferred form of the invention is not the only form that may be employed. One essential idea is for the vane to lead the bait or lure so far off laterally that the angular pull of the line is effective to change the setting of the vane. While we perform the change of position of the vane through slacking off and again pulling the line, we are aware that such shift may be made automatically because of the increasing angularity of the retrieving line.

We have indicated some of the preferred forms of our invention but it is understood that the structural elements are susceptible to various modifications and changes without departing from the spirit of the claims and we do not wish it to be understood that our invention is limited to the specific forms, arrangements or constructions shown.

Having thus described our invention, what we claim as new and desire to secure by Letters Patent is—

1. In an artificial bait in combination, a body, a guideway attached thereto, a rudder having a bar portion which operates in said guideway, means operating to hold said bar portion of the rudder in the rear portion of said guideway, and a line attached to said rudder operating to pull said bar forward in said guideway.

2. An artificial bait having at its forward end a movable rudder which is vertical at all times with respect to the normal position of the bait.

3. In combination, a buoyant body, a Y-shaped guide, a rudder consisting of two blades connected by a flat connecting bar, said connecting bar being adapted to operate within the Y-shaped guide, spring means operating to retain the connecting bar in the base of the Y-shaped guide, and means for attaching a line to said connecting bar.

4. A movable rudder on the front end of a fish bait, said rudder being adapted to move in a generally forward direction into a fixed guiding position which is vertical with respect to the normal position of the bait.

5. A fish bait rudder having two forwardly extending blades connected at their rear portions.

6. A fish bait rudder having two forwardly extending blades connected at their rear portions and having means for attaching a line to said connecting element.

7. In an artificial bait, a movable rudder, guideways adapted to control the direction in which the said rudder points and pulling means attached to said rudder at a point back of the forward portion thereof.

8. In a fish bait, a body, a rudder on the front end thereof, said rudder being adapted to move laterally from one side of the longitudinal axis of the body to the other side thereof.

9. In a bait, the combination of a body, a direction controlling vane at the front end thereof, a pulling line connected to the vane and means for causing the vane to assume one of two operative positions under the pull of the line for changing the direction of movement in which the line pulls the body.

10. In a fish bait, a movable rudder located on the forward portion thereof, said rudder being adapted to move forwardly to a fixed vertical position with respect to the bait when tension is applied thereto and means for retracting said rudder when said tension is released.

11. In a fish bait a movable rudder on the front end thereof, a line attached thereto and a V-shaped guideway adapted to hold said rudder in either one of two positions when tension is applied to the line and adapted to permit the rudder to be moved toward the body of the bait when tension on the line is released.

12. In a fish bait, a movable rudder on the front end thereof, said rudder being adapted to shift from one side of the bait to the other, a line attached to said rudder and fixed means for preventing lateral movement of the rudder when tension is applied to said line and permitting lateral shifting of said rudder when tension is removed from said line.

In witness whereof, we hereunto subscribe our names this 13th day of September, 1924.

JOHN A. DIENNER.
ALEXANDER C. MABEE.